United States Patent
Jeong et al.

(10) Patent No.: US 10,367,537 B2
(45) Date of Patent: Jul. 30, 2019

(54) MOBILE COMMUNICATION USING A PLURALITY OF SUBSCRIBER IDENTITY MODULES

(71) Applicant: Samsung Electronics Co., Ltd., Suwon-si (KR)

(72) Inventors: Wook Hyun Jeong, Suwon-si (KR); Ha Yang Seo, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 386 days.

(21) Appl. No.: 14/927,095

(22) Filed: Oct. 29, 2015

(65) Prior Publication Data
US 2016/0126996 A1    May 5, 2016

(30) Foreign Application Priority Data

Oct. 29, 2014  (KR) .................. 10-2014-0148557

(51) Int. Cl.
| | |
|---|---|
| *H04W 8/18* | (2009.01) |
| *H04W 48/16* | (2009.01) |
| *H04W 60/00* | (2009.01) |
| *H04W 76/16* | (2018.01) |
| *H04W 76/28* | (2018.01) |
| *H04W 88/06* | (2009.01) |
| *H04B 1/3816* | (2015.01) |

(52) U.S. Cl.
CPC ........ *H04B 1/3816* (2013.01); *H04W 60/005* (2013.01); *H04W 76/16* (2018.02); *H04W 76/28* (2018.02); *H04W 8/183* (2013.01); *H04W 48/16* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 8,811,421 B2 | 8/2014 | Su et al. | |
| 9,125,240 B2 | 9/2015 | Su et al. | |
| 2012/0014252 A1* | 1/2012 | Martin .................. | H04W 28/20 370/235 |
| 2013/0023275 A1 | 1/2013 | Mutya et al. | |
| 2013/0156081 A1* | 6/2013 | Tat ........................ | H04W 88/06 375/222 |
| 2013/0303240 A1 | 11/2013 | Sanka et al. | |
| 2013/0329639 A1* | 12/2013 | Wietfeldt .............. | H04W 88/06 370/328 |
| 2013/0337861 A1 | 12/2013 | Bhogaraju et al. | |

(Continued)

OTHER PUBLICATIONS

European Search Report for Appln No. 15192052.7 dated Feb. 26, 2016.

(Continued)

*Primary Examiner* — Vladimir Magloire
*Assistant Examiner* — Donald H B Braswell
(74) *Attorney, Agent, or Firm* — Jefferson IP Law, LLP

(57) ABSTRACT

An electronic device is provided. The electronic device may include a first subscriber identity module, a second subscriber identity module, and a communication module to communicate data via a first network using the first subscriber identity module, wherein the communication module may activate the second subscriber identity module during a tune-away period for a second network to communicate the data.

15 Claims, 9 Drawing Sheets

(56) References Cited

U.S. PATENT DOCUMENTS

| | | | |
|---|---|---|---|
| 2014/0086209 A1 | 3/2014 | Su et al. | |
| 2014/0120925 A1* | 5/2014 | Kanthala | H04W 72/04 |
| | | | 455/450 |
| 2014/0140287 A1* | 5/2014 | Cheng | H04W 76/10 |
| | | | 370/329 |
| 2014/0355505 A1 | 12/2014 | Su et al. | |
| 2015/0057046 A1* | 2/2015 | Challa | H04W 48/12 |
| | | | 455/558 |

OTHER PUBLICATIONS

Communication pursuant to Article 94(3) EPC dated Mar. 20, 2018 corresponding to European Patent Application No. 15192052.7.
Office Action dated May 9, 2018 corresponding to Chinese Patent Application No. CN 201510717627.3.

* cited by examiner

US 10,367,537 B2

MOBILE COMMUNICATION USING A PLURALITY OF SUBSCRIBER IDENTITY MODULES

RELATED APPLICATION(S)

This application claims the benefit under 35 U.S.C. § 119(a) of a Korean patent application filed on Oct. 29, 2014 in the Korean Intellectual Property Office and assigned Serial number 10-2014-0148557, the entire disclosure of which is hereby incorporated by reference.

BACKGROUND

The present disclosure relates to a technology for compensating for a decrease of data throughput which may occur during data communication via one subscriber identity module (SIM) by data communication via another SIM in a communication system using a plurality of SIMs.

Unlike second generation (2G) or third generation (3G) technology for a circuit-switched (CS) network, Long-Term Evolution (LTE) (or post-4G technology) supports a packet-switched network. Even if the LTE technology is used, a voice call service may be provided via a CS network. For example, one of solutions used for this purpose is a circuit switched fallback (CSFB) technology whereby user equipment (UE) is disconnected from a 4G network and then is connected to a 3G network so that the UE performs a voice call if the voice call is received while the UE accesses the 4G network.

In mobile communication markets of regions where various communication service providers exist, such as China, Russia, South East Asia, Central and South America, etc., mobile terminals equipped with at least two SIMs are used. Such mobile terminals may support dual SIM dual standby (DSDS), dual SIM dual active (DSDA), dual SIM dual talk (DSDT), or a communication function using at least three SIMs.

According to the above-mentioned CSFB technology, a mobile communication service provider inserts CS call paging information between LTE signals in a core network and provides the resultant signals to user equipment. However, in the case where a technology such as single radio Long-Term Evolution (SRLTE, support both LTE and 2G/3G communication with one antenna) is used so that the user equipment periodically searches for a 3G network to check whether CS paging information exists, LTE data throughput may be decreased in a period for searching for a 3G network, i.e., a tune-away period.

According to the 3$^{rd}$ Generation Partnership Project (3GPP) specifications, a CS paging period of user equipment ranges from a minimum of 470 ms to a maximum of 2.12 s, and a period of LTE disconnection (i.e., a tune-away period for connection to a 3G network) may be about 15-50 ms. That is, in the case of user equipment that supports the SRLTE, data communication (transmission and/or reception) may be suspended for 15-50 ms at a period of 470 ms to 2.12 s while the user equipment performs the data communication (transmission and/or reception).

SUMMARY

Accordingly, an aspect of the present disclosure is to provide a method for compensating for a decrease of data throughput which occurs in a tune-away period using a plurality of subscriber identity modules.

In accordance with as aspect of the present disclosure, an electronic device is provided. The electronic device includes a first subscriber identity module, a second subscriber identity module, and a communication module to communicate (for example, transmitting and/or receiving) data via a first network using the first subscriber identity module, wherein the communication module activates the second subscriber identity module during a tune-away period for a second network to communicate (transmit and/or receive) the data.

DETAILED DESCRIPTION

Figure 1:
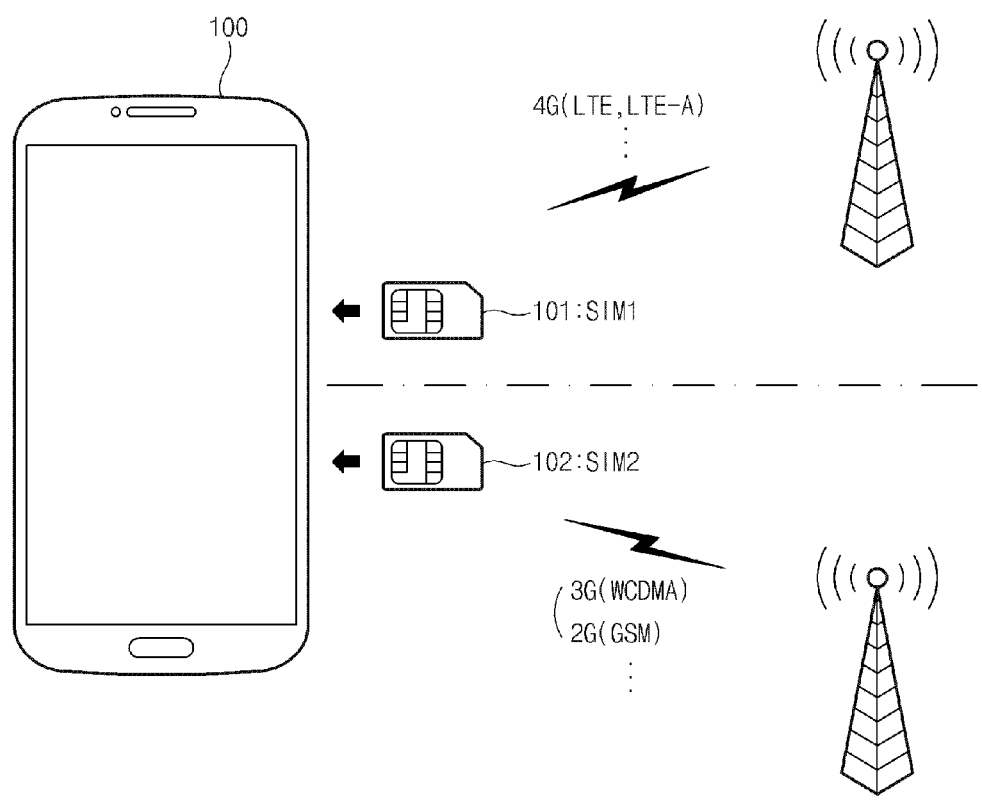
FIG. 1 is a conceptual diagram illustrating a communication system using a plurality of subscriber identity modules according to various embodiments of the present disclosure.

Hereinafter, various embodiments of the present disclosure will be described in detail with reference to the accompanying drawings. However, it should be understood that the present disclosure is not limited to specific embodiments, but rather includes various modifications, equivalents and/or alternatives of various embodiments of the present disclosure. Regarding description of the drawings, like reference numerals may refer to like elements.

The term "have", "may have", "include", "may include" or "comprise" used herein indicates the existence of a corresponding feature (e.g., a number, a function, an operation, or an element) and does not exclude the existence of an additional feature.

The term "A or B", "at least one of A and/or B", or "one or more of A and/or B" may include all possible combinations of items listed together. For example, the term "A or B", "at least one of A and B", or "at least one of A or B" may indicate all the cases of (1) including at least one A, (2) including at least one B, and (3) including at least one A and at least one B.

The term "first", "second" or the like used herein may modify various elements regardless of the order and/or priority thereof, but does not limit the elements. For example, "a first user device" and "a second user device" may indicate different user devices regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" may be interchangeably used with the term, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation, or a generic-purpose processor (e.g., a CPU or an application processor) for executing at least one software program stored in a memory device to perform a corresponding operation.

The terminology used herein is not for delimiting the present disclosure but for describing specific various embodiments. The terms of a singular form may include plural forms unless otherwise specified. The terms used herein, including technical or scientific terms, have the same meanings as understood by those skilled in the art. Commonly-used terms defined in a dictionary may be interpreted as having meanings that are the same as or similar to contextual meanings defined in the related art, and should not be interpreted in an idealized or overly formal sense unless otherwise defined explicitly. Depending on cases, even the terms defined herein should not be such interpreted as to exclude various embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device (e.g., smart glasses, a head-mounted device (HMD), an electronic apparel, an electronic bracelet, an electronic necklace, an electronic appcessory, an electronic tattoo, a smart mirror, or a smartwatch).

In some various embodiments of the present disclosure, an electronic device may be a smart home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global positioning system (GPS) receiver, an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller's machine (ATM), a point of sales (POS) of a store, or an Internet of things device (e.g., a bulb, various sensors, an electric or gas meter, a sprinkler, a fire alarm, a thermostat, a streetlamp, a toaster, exercise equipment, a hot water tank, a heater, a boiler, or the like).

According to some various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). In various embodiments of the present disclosure, an electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of technology.

Hereinafter, an electronic device according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a conceptual diagram illustrating a communication system using a plurality of subscriber identity modules according to various embodiments of the present disclosure.

Referring to FIG. 1, an electronic device 100 may be equipped with a plurality of subscriber identity modules, for example, a SIM1 101 (or a first subscriber identity module) and a SIM2 102 (or a second subscriber identity module) (hereinafter referred to as "SIM"). The SIM may be contained in a regular SIM card (e.g., a universal integrated circuit card (UICC)) so as to be mounted in the electronic device 100. The SIM may include not only physical SIM cards having various sizes, such as a regular SIM card, a micro SIM card, a nano SIM card, or the like, but also a software module-type subscriber identity module loaded on a specific memory area of the electronic device 100, such as an embedded UICC (eUICC). Furthermore, the electronic device 100 may be equipped with at least three SIMs or SIM cards.

In various embodiments of the present disclosure, the electronic device 100 may communicate with different-type networks using the SIM1 101 and the SIM2 102. For example, the SIM1 101 may support Long-Term Evolution (LTE) or LTE-Advanced (LTE-A) communication based on a packet-switched network. The SIM2 102 may support 2G/3G communication such as Global System for Mobile communication (GSM) or Wideband Code-Division Multiple Access (WCDMA) based on a circuit-switched network. In various embodiments of the present disclosure, the SIM1 101 or the SIM2 102 may support both the packet-switched network and the circuit-switched network. For example, the SIM1 101 may perform an operation (e.g., a tune-away operation) of checking information received via the circuit-switched network periodically while being connected to the packet-switched network (e.g., LTE), to thereby support both the two types of networks.

In various embodiments of the present disclosure, the electronic device 100 may communicate with networks of different frequency bands or different communication service providers using the SIM1 101 and the SIM2 102. The SIM1 101 may support a network of a first communication service provider (e.g., SK Telecom), and the SIM2 102 may support a network of a second communication service provider (e.g., AT&T).

The electronic device 100 may be user equipment (UE) that supports dual SIM dual standby (DSDS), dual SIM dual active (DSDA), or dual SIM dual talk (DSDT). In the case where the electronic device 100 is user equipment that supports the DSDS, the electronic device 100 may be in a standby state for both a communication network supported by the SIM1 101 and a communication network supported by the SIM2 102. Then, if one SIM (e.g., the SIM1 101) is activated and connected to a specific network, the other SIM (e.g., the SIM2 102) may be in an inactive state. In the above-mentioned example, if it is no longer appropriate to maintain communication using the SIM1 101 due to selection by a user or a change in a network state/location of the electronic device 100, the SIM2 102 may be activated and connected to another network, and the SIM1 101 may enter an inactive state. In various embodiments of the present disclosure, in the case where the electronic device 100 is user equipment that supports the DSDA or the DSDT, the electronic device 100 may be in an active state for both a communication network supported by the SIM1 101 and a communication network supported by the SIM2 102. However, in the case where the electronic device 100 is user equipment that supports the DSDS, software or hardware configuration for activating a plurality of SIMs at a specific time may be changed in order to apply various embodiments disclosed herein.

Figure 2:
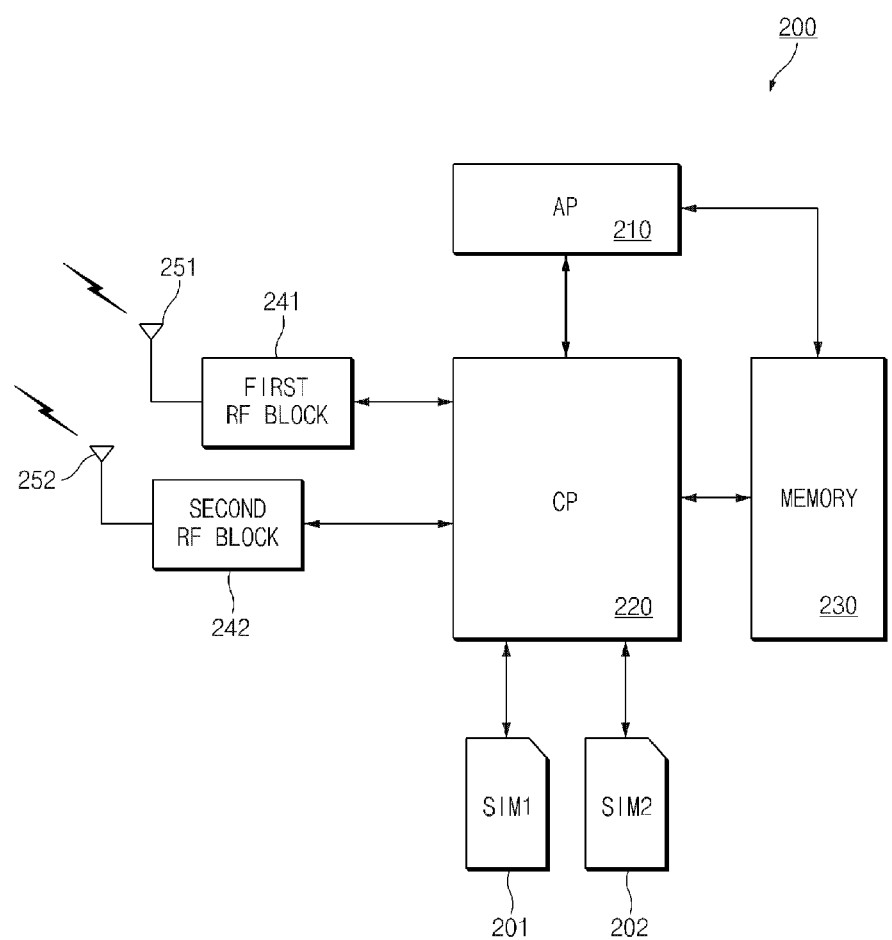
FIG. 2 is a diagram exemplarily illustrating an electronic device for performing communication using a plurality of subscriber identity modules according to various embodiments of the present disclosure.

FIG. 2 is a diagram exemplarily illustrating an electronic device for performing communication using a plurality of subscriber identity modules according to various embodiments of the present disclosure.

Referring to FIG. 2, an electronic device 200 (e.g., the electronic device 100) may include an application processor (AP) 210, a communication processor (CP) 220, a memory 230, a first radio frequency (RF) block 241, a second RF block 242, a first antenna 251, a second antenna 252, a SIM1 201, and a SIM2 202. In various embodiments of the present disclosure, one SIM may correspond to at least one RF block and antenna.

The elements of the electronic device 200 illustrated in FIG. 2 are merely examples for describing various embodiments of the present disclosure, and thus other elements may be added or may replace the illustrated elements within the level of ordinary skill in the art. More general configuration of the electronic device 200 will be described later with reference to FIGS. 4 through 8.

In various embodiments of the present disclosure, the AP 210 may control hardware of the electronic device 200 and various operations thereof. The AP 201 may execute an algorithm configured in the AP 210 or instructions stored in the memory 230, and may make a request for communication (e.g., transmission and/or reception) of data via the CP 220, or may store communicated (e.g., transmitted and/or received) data in the memory 230. In some various embodiments of the present disclosure, the AP 210 and the CP 220 may be integrated into one chip and may be construed as one processor.

The CP 220 may enable the electronic device 200 to communicate with an external network (e.g., a base station eNodeB or the like), a server (e.g., a service provider or the like) connected via an external network, or other user equipment.

In various embodiments of the present disclosure, the CP 220 may communicate with an external network using the SIM1 201. In the case of performing communication using the SIM1 201, the CP 220 may communicate with the external network using the first antenna 251 connected to the first RF block 241. The first antenna 251 may be one communicating (e.g., transmitting and/or receiving) antenna, and may further include a diversity receiving antenna (diversity Rx). In the case where the electronic device 200 communicates with an external network using the SIM2 202, the CP 220 may communicate with the external network using the second antenna 252 connected to the second RF block 242. The above description of the first antenna 251 may be correspondingly applied to the second antenna 252.

In the case where the electronic device 200 is user equipment that supports the DSDS, the CP 220 may set a state of communication via the SIM2 202 at a standby state while performing communication using the first RF block 241 and the first antenna 251 associated with the SIM1 201, or vice versa. In the case where the electronic device 200 is user equipment that supports the DSDA or the DSDT, the CP 220 may activate both communication via the SIM1 201 and communication via the SIM2 202. Alternatively, the CP 220 may temporarily activate or inactivate communication via the SIM2 202 while communication via the SIM1 201 is active.

In various embodiments of the present disclosure, the first RF block 241 or the second RF block 242 (hereinafter referred to as an RF block) may include various modules for generating or processing signals communicated (transmitted and/or received) via an antenna (e.g., the first antenna 251 or the second antenna 252). For example, the RF block may include various filters (e.g., a band select filter, an image reject filter, or the like), an amplifier (e.g., a low noise amplifier (LNA), a power amplifier, or the like), a mixer, an oscillator, and the like.

An electronic device (e.g., the electronic device 100 or 200) according to various embodiments of the present disclosure may be user equipment capable of performing communication via a first subscriber identity module temporarily (e.g., during a tune-away period) or continuously while performing communication via a second subscriber identity module. For example, various embodiments disclosed herein are applicable even to user equipment that supports the DSDS provided that the user equipment is configured so as to enable communication via a plurality of SIMs by software modification or provider policy modification.

A method for compensating for a decrease of data throughput which occurs in a tune-away period is described below with reference to FIG. 3.

Figure 3:
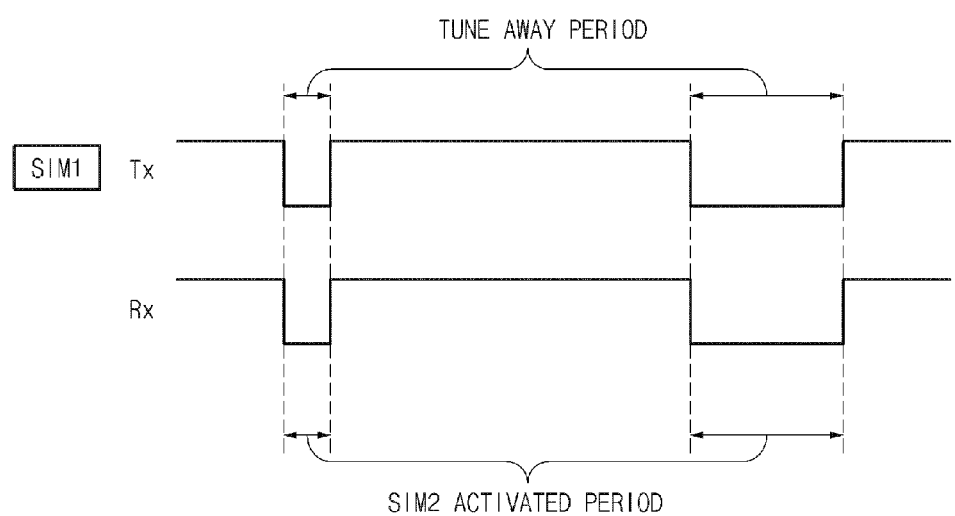
FIG. 3 is a conceptual diagram illustrating a tune-away period and data throughput according to various embodiments of the present disclosure.

FIG. 3 is a conceptual diagram illustrating a tune-away period and data throughput according to various embodiments of the present disclosure.

For reference, FIG. 3 is a graph of data throughput ideally illustrated for convenience. Therefore, an actual data throughput graph may be more gradually changed (decreased or recovered).

Referring to FIG. 3, the electronic device 200 may perform communication using a first subscriber identity module (e.g., the SIM1 201). At this moment, a second subscriber identity module (e.g., the SIM2 202) may be in a standby state. The electronic device 200 may perform a tune-away operation so that an antenna directed towards a first network (e.g., a Packet-Switched (PS) domain network) is directed towards a second network (e.g., a Circuit-Switched (CS) domain network) in order to obtain CS paging information. For example, the electronic device 200 may direct an antenna directed towards a 4G network (e.g., LTE or LTE-A) towards a 2G or 3G network (e.g., GSM or WCDMA) for the purpose of CS paging. A CS paging period may be defined as "51-multi-frame period×BS_PA_M-FRMS" according to the 3GPP specifications. Here, a length of the 51 multi frame is about 235.4 ms, and a value of the BS_PA_MFRMS may be provided from a communication service provider network. Normally, the value of the BS_PA_MFRMS may be between 2 and 9. Therefore, the CS paging period may have a minimum value of about 470 ms and a maximum value of about 2.12 s. However, in various embodiments of the present disclosure, the length of the CS paging period may be changed due to modification of communication standards or other circumstances.

In a tune-away period during the CS paging period, the data throughput may decrease since data is unable to be communicated (e.g., transmitted and/or received) to/from an LTE network. It would be understood from FIG. 3 that all data throughputs of the tune-away periods are decreased. As shown in the graph, the length of the tune-away period may be variable, since returning to LTE is quick in the case of non-existence of the CS paging information, but, in the case of existence of the CS paging information, it takes a time to perform processing according to the information in a CS domain.

In this state, the electronic device 200 may activate the second subscriber identity module (e.g., the SIM2 202) to perform communication (e.g., transmission and/or reception) of at least a part of data. For example, in the case where the electronic device 200 uses a video streaming service via a service provider application such as YouTube, a control instruction (e.g., pause, play, skip forward or backward by 10 seconds, or the like) input in the tune-away period of the electronic device 200 may be transmitted to a server after termination of the tune-away operation. Such a delay may be undesirable in terms of user experience. However, in the case where the electronic device 200 activates the second subscriber identity module and communicates (e.g., transmits and/or receives) such a control instruction during the tune-away period, the above-mentioned delay does not occur even if communication via the first subscriber identity module enters the tune-away period. In particular, in the case of a streaming service, since the electronic device 200 may pre-store a part of content in the memory 230 for the purpose of buffering, a continuous streaming service may be provided without giving a delay to a user even if an instruction such as skipping (e.g., skip forward by 10 seconds) is input.

In various embodiments of the present disclosure, a method of compensating for a decrease of data throughput using the second subscriber identity module may be applied differently according to a data packet to be communicated (e.g., transmitted and/or received). For example, if large-size data such as video content is streamed using the second subscriber identity module in the above-mentioned example, it may be required that the second subscriber identity module should remain in an active state even after termination of the tune-away operation or data received by the second subscriber identity module at the moment of termination of the tune-away operation should be relayed to the first subscriber identity module so that the data is continuously received. Various embodiments of the present disclosure related to this configuration will be described later with reference to FIGS. 5 through 7, and an exemplary electronic device to which various embodiments of the present disclosure are applicable is described below with reference to FIG. 4.

Figure 4:
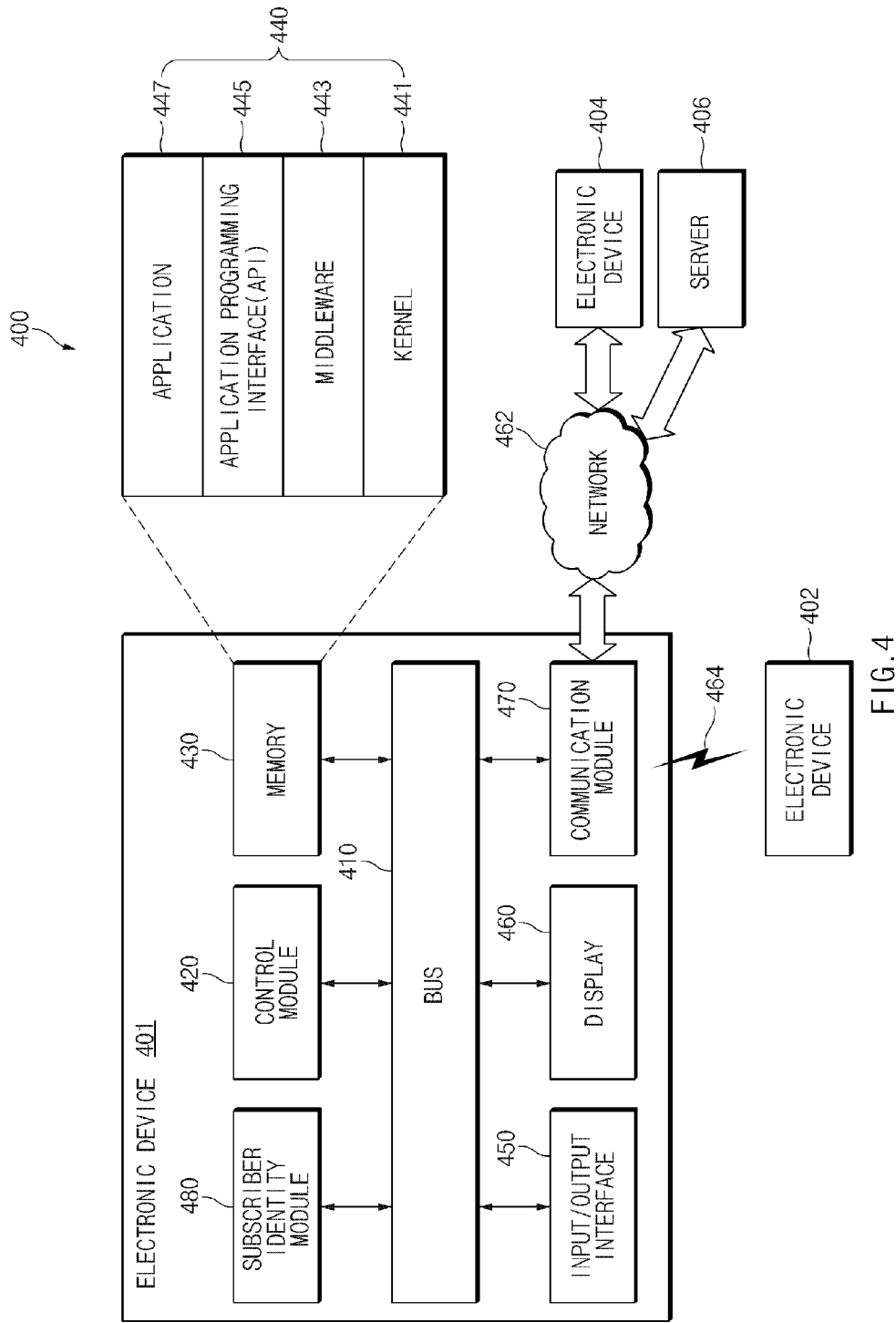
FIG. 4 illustrates an electronic device in a network environment according to various embodiments of the present disclosure.

FIG. 4 illustrates an electronic device in a network environment according to various embodiments of the present disclosure.

An electronic device 401 in a network environment 400 according to various embodiments of the present disclosure will be described with reference to FIG. 4. The electronic device 401 may correspond to any of the electronic devices 100, 102, 104 of FIG. 1, and the electronic device 200. The electronic device 401 may include a bus 410, a control module 420, a memory 430, an input/output interface 450, a display 460, a communication module 470, and a plurality of subscriber identity modules 480. In some various embodiments of the present disclosure, at least one of the foregoing elements may be omitted or another element may be added to the electronic device 401.

The bus 410 may include a circuit for connecting the above-mentioned elements, such as, the bus 410, the control module 420, the memory 430, the input/output interface 450, the display 460, the communication module 470, and the plurality of subscriber identity modules 480, to each other and transferring communications (e.g., control messages and/or data) among the above-mentioned elements.

The control module 420 may include at least one of a central processing unit (CPU), an application processor (AP), or a communication processor (CP). For example, the control module 420 may correspond to the AP 210 of FIG. 2, or may correspond to a combination of the AP 210, the CP 220, and other operational units. Furthermore, the control module 420 may perform data processing or an operation for communication and/or control of at least one of the other elements of the electronic device 401.

The memory may include a volatile memory and/or a nonvolatile memory. The memory 430 may correspond to, for example, the memory 230 of FIG. 2. The memory 430 may store an instruction or data related to at least one of the other elements of the electronic device 401. According to an embodiment of the present disclosure, the memory 430 may store software and/or a program 440. The program 440 may include, for example, a kernel 431, a middleware 433, an application programming interface (API) 435, and/or an application program (or an application) 437. At least a portion of the kernel 431, the middleware 433, or the API 435 may be referred to as an operating system (OS).

The kernel 431 may control or manage system resources (e.g., the bus 410, the control module 420, the memory 430, or the like) used to perform operations or functions of other programs (e.g., the middleware 433, the API 435, or the application program 437). Furthermore, the kernel 431 may provide an interface for allowing the middleware 433, the API 435, or the application program 437 to access individual elements of the electronic device 401 in order to control or manage the system resources.

The middleware 433 may serve as an intermediary so that the API 435 or the application program 437 communicates and exchanges data with the kernel 431. Furthermore, middleware 433 may process one or more task requests received from the application program 437 according to a priority order. For example, the middleware 433 may assign the application program 437 a priority for using the system resources (e.g., the bus 410, the control module 420, the memory 430, or the like) of the electronic device 401. For example, the middleware 433 may process the one or more task requests according to the priority assigned to the application program 437, thereby performing scheduling or load balancing on the one or more task requests.

The API 435 may include at least one interface or function (e.g., an instruction) for file control, window control, image processing, character control, or the like as an interface for allowing the application program 437 to control a function provided by the kernel 431 or the middleware 433.

The input/output interface 450 may serve to transfer an instruction or data input from a user or another external device to other element(s) of the electronic device 401. Furthermore, the input/output interface 450 may output an instruction or data received from other element(s) of the electronic device 401 to the user or another external device.

The display 460 may include, for example, a liquid crystal display (LCD), a light-emitting diode (LED) display, an organic light-emitting diode (OLED) display, a microelectromechanical systems (MEMS) display, or an electronic paper display. The display 460 may show various content (e.g., a text, an image, a video, an icon, a symbol, or the like) to the user. The display 460 may include a touchscreen, and may receive a touch, gesture, proximity or hovering input from an electronic pen or a part of a body of the user.

The communication module 470 may correspond to the CP 220 of FIG. 2. In various embodiments of the present disclosure, the communication module 470 may correspond to a combination of the CP 220, an RF block (e.g., the first RF block 241 or the second RF block 242), and an antenna (e.g., the first antenna 251 or the second antenna 252). The communication module 470 may access networks that support different communication modes or networks of different providers using the plurality of subscriber identity modules 480 (e.g., the SIM1 201 or the SIM2 202) respectively.

In various embodiments of the present disclosure, the communication module 470 may set communication between the electronic device 401 and an external device (e.g., a first external electronic device 402, a second external electronic device 404, or a server 406). For example, the communication module 470 may be connected to a network 462 via wireless or wired communications so as to communicate with the external device (e.g., the second external electronic device 404 or the server 406).

For example, at least one of cellular communication protocols such as LTE, LTE-A, Code-Division Multiple Access (CDMA), WCDMA, Universal Mobile Telecommunications System (UMTS), Wireless Broadband (WiBro), GSM, or the like may be used for the wireless communications. For example, the communication module 470 may support at least one PS network and at least one CS network. The wireless communications may include, for example, a short-range communications 464. The short-range communications 464 may include at least one of Wi-Fi, Bluetooth, near field communication (NFC), global positioning system (GPS), or the like. The wired communications may include at least one of universal serial bus (USB), high definition multimedia interface (HDMI), serial communication standard, such as, for example, RS-232, plain old telephone service (POTS), or the like. The network 462 may include at least one of telecommunications networks, for example, a computer network (e.g., a local area network (LAN) or wide area network (WAN), the Internet, or a telephone network.

The subscriber identity module 480 may include a plurality of subscriber identity modules. For example, the subscriber identity module 480 may include a SIM card for a first communication service provider and a SIM card for a second communication service provider. For another example, the subscriber identity module 480 may include a SIM1 that supports a first communication network (e.g., an LTE network) and a SIM2 that supports a second communication network (e.g., a 2G/3G network).

The types of the first external electronic device 402 and the second external electronic device 404 may be the same as or different from the type of the electronic device 401. According to an embodiment of the present disclosure, the server 406 may include a group of one or more servers. According to various embodiments of the present disclosure, a portion or all of operations performed in the electronic device 401 may be performed in one or more other electronic devices (e.g., the first external electronic device 402, the second external electronic device 404, or the server 406). According to an embodiment of the present disclosure, in the case where the electronic device 401 should perform a certain function or service automatically or in response to a request, the electronic device 401 may request at least a portion of functions related to the function or service from another device (e.g., the first external electronic device 402, the second external electronic device 404 or the server 406) instead of or in addition to performing the function or service for itself. The other electronic device (e.g., the first external electronic device 402, the second external electronic device 404, or the server 406) may perform the requested function or additional function, and may transfer a result of the performance to the electronic device 401. The electronic device 401 may use or additionally process the received result to provide the requested function or service. To this end, for example, a cloud computing technology, a distributed computing technology, or a client-server computing technology may be used.

An electronic device according to various embodiments of the present disclosure may include first and second subscriber identity modules and a communication module for communicating (e.g., transmitting and/or receiving) data via a first network using the first subscriber identity module, wherein the communication module may activate the second subscriber identity module during a tune-away period for a second network to communicate (e.g., transmit and/or receive) at least a part of the data.

In various embodiments of the present disclosure, the communication module may inactivate the second subscriber identity module upon termination of the tune-away period.

In various embodiments of the present disclosure, the communication module may communicate (e.g., transmit and/or receive) the at least a part of the data based on a packet type during the tune-away period. Furthermore, the communication module may communicate (e.g., transmit and/or receive) data of which the packet type is a control message type using the second subscriber identity module.

In various embodiments of the present disclosure, the communication module may communicate (e.g., transmit and/or receive) the at least a part of the data based on a size of packets during the tune-away period.

In various embodiments of the present disclosure, the electronic device may further include a memory in which a database is stored, and the communication module may communicate (e.g., transmit and/or receive) the at least a part of the data based on the database. The database may store at least one of parameters including at least one application run in the electronic device, a process included in the application, a task included in the process, the type of packets associated with the task or the process, an average size of the packets, and a priority order of communication (e.g., transmission and/or reception) by the second subscriber identity module. In this case, the communication module may communicate (transmit and/or receive) the at least a part of the data based on the at least one of the parameters. More specifically, the communication module may communicate (e.g., transmit and/or receive) the at least a part of the data based on the priority order among the parameters.

In various embodiments of the present disclosure, the communication module may inactivate the second subscriber identity module after communication (e.g., transmission and/or reception) of the at least a part of the data is completed even if the tune-away period for the second network is terminated.

In various embodiments of the present disclosure, the first network may be a packet-switched (PS) network and the second network may be a circuit-switched (CS) network.

In various embodiments of the present disclosure, the communication module may communicate (transmit and/or receive) the at least a part of the data using a network of a frequency band different from that of the first network, the network being associated with the second subscriber identity module.

In various embodiments of the present disclosure, the communication module may communicate (e.g., transmit and/or receive) the at least a part of the data using a network of a communication service provider different from that of the first network, the network being associated with the second subscriber identity module.

In various embodiments of the present disclosure, each of the first and second subscriber identity modules may be contained in a universal integrated circuit card (UICC) so as to be inserted into the electronic device, or may be contained in an embedded universal integrated circuit card (eUICC) embedded in the electronic device.

Figure 5:
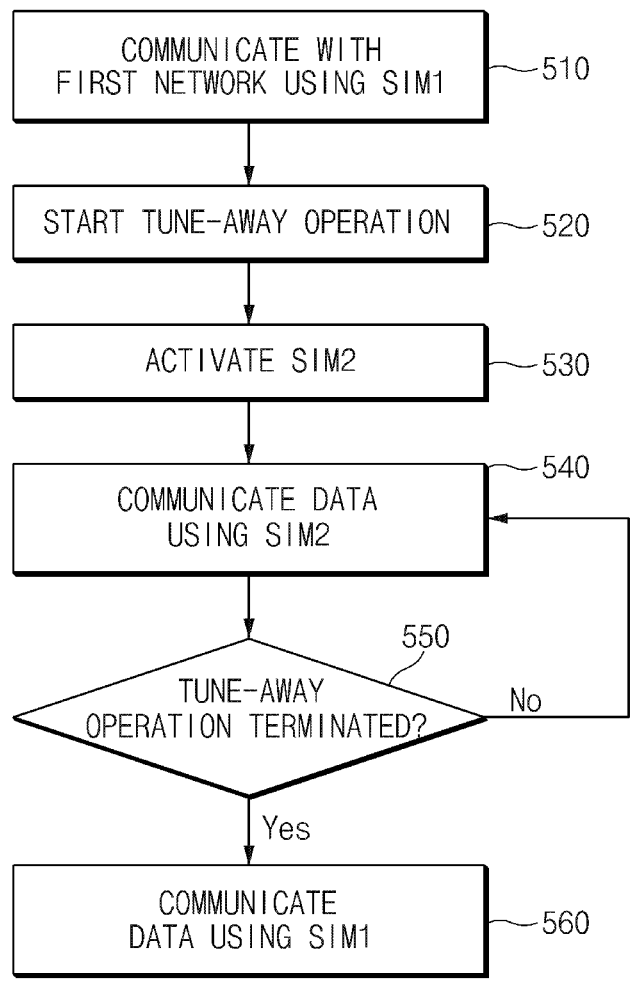
FIG. 5 is a flowchart illustrating a communication method using a plurality of subscriber identity modules according to various embodiments of the present disclosure.

FIG. 5 is a flowchart illustrating a communication method using a plurality of subscriber identity modules according to various embodiments of the present disclosure. For example, the communication method of FIG. 5 may be construed as a method of preventing a decrease of data throughput which is performed by the electronic device 100, the electronic device 200, or the electronic device 401. The following description is based on the electronic device 401 of FIG. 2, but may be correspondingly applied to the electronic device 100 or the electronic device 200.

In operation 510, the electronic device 401 may be connected to a first network (e.g., an LTE network) using a first subscriber identity module (e.g., the SIM1 201). For example, the communication module 470 may be connected to the first network associated with the first subscriber identity module among the plurality of subscriber identity modules 480 in consideration of a user's selection or a current network situation.

In various embodiments of the present disclosure, the first subscriber identity module may support a PS network and a CS network. For example, the electronic device 401 may be connected to the CS network (e.g., the second network) in such a manner that the electronic device 401 receives a CS call while being connected to the PS network (e.g., an LTE network) (e.g., CSFB), or the electronic device 401 receives CS paging information from a base station, or the electronic device 401 searches for the CS paging information.

In operation 520, the communication module 470 may perform an operation of tune away from the first network to the second network in order to search for the CS paging information in the electronic device 401. For example, the communication module 470 may temporarily change a communication (e.g., transmission and/or reception) frequency band from a first frequency band corresponding to the first network to a second frequency band corresponding to the second network so as to obtain paging information of the second network (CS network).

If the tune-away operation is started in operation 520, reception of data via the first network may be temporarily (e.g., for about 15-50 ms) suspended. In operation 530, the electronic device 401 may activate a second subscriber identity module (e.g., the SIM2 202) in response to the start of the tune-away operation. For example, the electronic device 401 may be user equipment that supports the DSDA or DSDT whereby both the first and second subscriber identity modules may be simultaneously activated, and the second subscriber identity module may enter an active state after remaining in a standby state (inactive state) if the tune-away operation is started. That is, both the first and second subscriber identity modules may be in an active state by operation 530.

If the second subscriber identity module is activated in operation 530, the electronic device 401 may perform data communication (e.g., transmission and/or reception) using the second subscriber identity module in operation 540. For example, in the case where the first electronic device 401 has been communicating with an external network (e.g., a server or another user equipment) using the first subscriber identity module, the electronic device 401 may maintain, during the tune-away period, communication (e.g., transmission and/or reception) of at least a part of data that has been being communicated (e.g., transmitted and/or received), using the second subscriber identity module. For example, in the case where the electronic device 401 enters the tune-away period while accessing an arbitrary web site and loading a web page therefrom, the electronic device 401 may receive script information or text content in the web page using the second subscriber identity module, and, after termination of the tune-away period, the electronic device 401 may perform a task that requires sequential data processing or an image/video file that is relatively large in size, using the first subscriber identity module. In other words, the electronic device 401 may communicate (e.g., transmit and/or receive) data using the second subscriber identity module according to an attribute or characteristic of data to be communicated (e.g., transmitted and/or received), during the tune-away period. This is merely an example, and various embodiments will be described with reference to FIGS. 6 and 7. However, it should be understood that such examples are not intended to limit the scope of technical concept of the present disclosure but are provided for the purpose of description.

Operation 540 may be continually performed until the tune-away operation is terminated. In operation 550, if it is determined that the tune-away operation is terminated, i.e., if the first subscriber identity module directed towards the second network returns towards the first network, the electronic device 401 may continue to communicate (e.g., transmit and/or receive) data using the first subscriber identity module. In this case, the second subscriber identity module may enter an inactive state in response to termination of the tune-away operation. However, in various embodiments of the present disclosure, in the case where communication (e.g., transmission and/or reception) of data via the second subscriber identity module is not completed (i.e., a data communication (e.g., transmission and/or reception) session is maintained) even if the electronic device 401 recognizes the termination of the tune-away operation, the electronic device 401 may inactivate the second subscriber identity module after the communication (e.g., transmission and/or reception) of data via the second subscriber identity module is completed.

Figure 6:
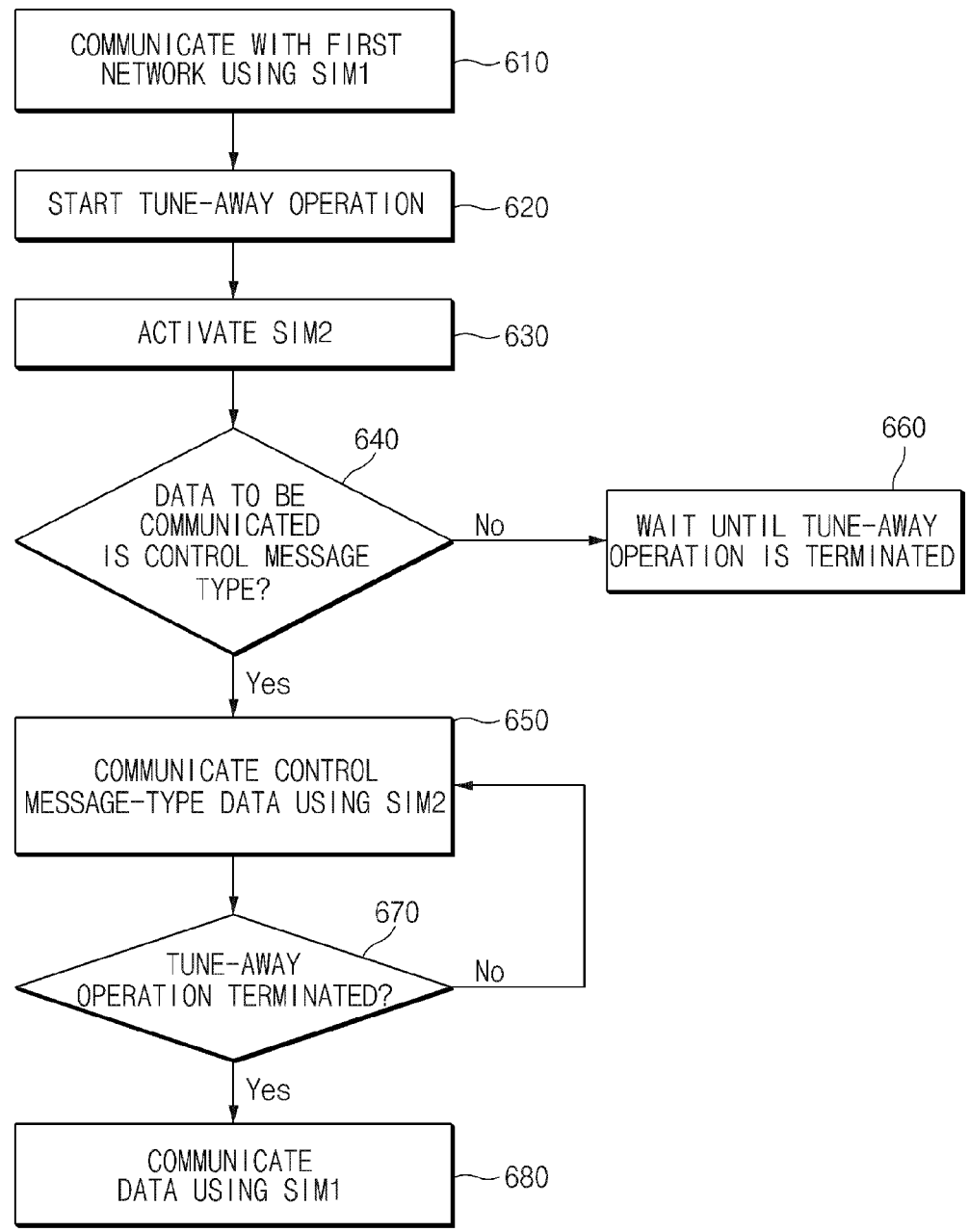
FIG. 6 is a flowchart illustrating a communication method based on a packet type of data according to various embodiments of the present disclosure.

FIG. 6 is a flowchart illustrating a communication method based on a packet type of data according to various embodiments of the present disclosure. Descriptions that are similar or correspond to or overlap with the above descriptions may not be provided below. For example, operations 610, 620, 630, 670, and 680 may correspond to operations 510, 520, 530, 550, and 560 of FIG. 5, respectively.

If an operation of tune away to the second network is started (operation 620) while communication with the first network is performed using the first subscriber identity module (operation 610), the second subscriber identity module may be activated (operation 630). If the second subscriber identity module is activated, the electronic device 401 may perform data communication (e.g., transmission and/or reception) via the second subscriber identity module based on a packet type of data to be communicated (e.g., transmitted and/or received).

In various embodiments of the present disclosure, the electronic device 401 may run various applications (e.g., the application 147). Each application may include at least one process. Each process may be segmented into tasks. Such a process or task may be classified, in terms of data packet, into a control message-type packet for exchanging simple text data and content-type data for exchanging data that is relatively large in size such as a video. In operation 640, the electronic device 401 may determine whether data to be communicated (e.g., transmitted and/or received), is the control message-type packet. If the data to be communicated (transmitted and/or received), is the control message-type packet, the electronic device 401 may communicate (e.g., transmit and/or receive) the data of the control message type using the second subscriber identity module in operation 650. If the data to be communicated (e.g., transmitted and/or received), is not the control message-type packet (e.g., the content-type packet), the electronic device 401 may wait for termination of the tune-away operation and then may receive the data via the first subscriber identity module upon the termination of the tune-away operation, in operation 660.

In various embodiments of the present disclosure, if the tune-away operation is terminated (operation 670), the electronic device 401 may continue to communicate (e.g., transmit and/or receive) data using the first subscriber identity module. In this case, the second subscriber identity module may enter an inactive state.

Figure 7:
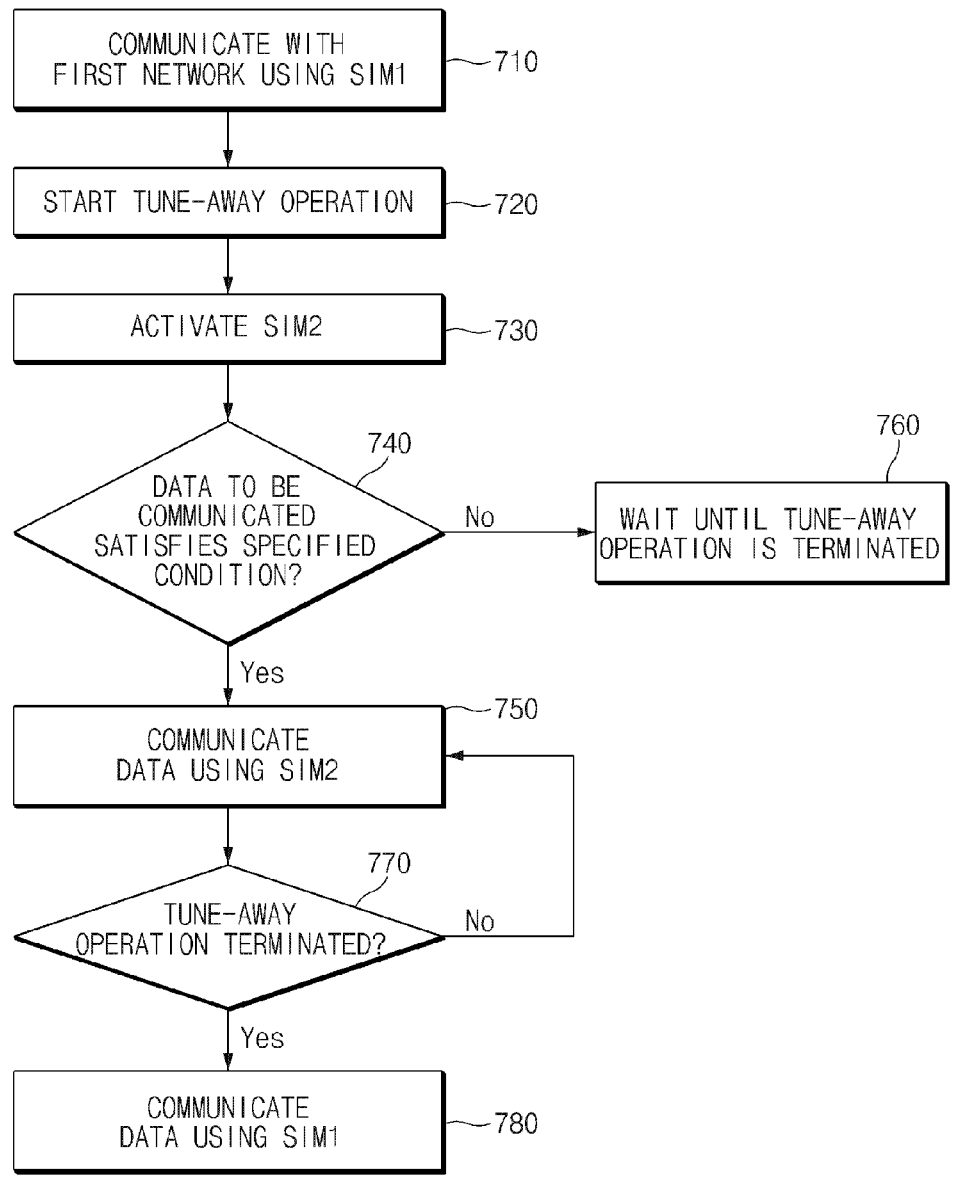
FIG. 7 is a flowchart illustrating a communication method based on a specified condition according to various embodiments of the present disclosure.

FIG. 7 is a flowchart illustrating a communication method based on a specified condition according to various embodiments of the present disclosure. Descriptions that are similar or correspond to or overlap with the above descriptions may not be provided below. For example, operations 710, 720, 730, 770, and 780 may correspond to operations 510, 520, 530, 550, and 560 of FIG. 5 respectively.

If an operation of tune away to the second network is started (operation 720) while communication with the first network is performed using the first subscriber identity module (operation 710), the second subscriber identity module may be activated (operation 730). If the second subscriber identity module is activated, the electronic device 401 may refer to the database established in the memory 430 to perform data communication (e.g., transmission and/or reception) for data that satisfies a specified condition using the second subscriber identity module.

In various embodiments of the present disclosure, the database may be established in various formats. For example, the electronic device 401 may include information on at least one of application information (e.g., a name and an identifier (ID)), process information, task information, a data packet type, and a communication (transmission and/or reception) priority order according to an identity module. An example of the database is shown Table 1 below.

TABLE 1

| Application Name and ID | Process Name and ID | Task Name and ID | Type | Average Size of Packets |
|---|---|---|---|---|
| com.kakao.talk | 16967 | com.kakao.talk/pause | Control Message Type | 130 Bytes |
| com.kakao.talk | 16967 | com.kakao.talk/message_session | Contents Type | 20 KB |
| . . . | . . . | . . . | . . . | . . . |

The priority order may be stored as a fixed value in the database, or may be determined at an operation time according to a state of a network or the electronic device 401. For example, the priority order may be determined such that a highest priority (priority 1) may be assigned to data of the control message type, a second highest priority (priority 2) may be assigned to data with a size of 1 KB or less among data of the content message type, a third highest priority (priority 3) is assigned to data with a size of 2 KB or less, and data with a size greater than 2 KB is not allowed to be communicated (e.g., transmitted and/or received) by the second subscriber identity module. Furthermore, the sizes of data associated with the priority order may be variously modified according to information such as payment information of a communication service provider or a network state.

In operation 740, the electronic device 401 may determine whether data to be communicated (transmitted and/or received), satisfies a specified condition. According to a result of the determination of operation 740, the electronic device 401 may perform data communication (e.g., transmission and/or reception) using the second subscriber identity module in operation 750. If the data to be communicated (e.g., transmitted and/or received), does not satisfy the specified condition, the electronic device 401 may wait for termination of the tune-away operation and then may receive the data via the first subscriber identity module upon the termination of the tune-away operation, in operation 760.

For example, as described above, only in the case where it is confirmed that data to be communicated (e.g., transmitted and/or received) is the control message type, data communication (e.g., transmission and/or reception) via the second subscriber identity module may be performed. In another example, only in the case where it is confirmed that data to be communicated (e.g., transmitted and/or received)

has a packet size of 2 KB or less, data communication (e.g., transmission and/or reception) via the second subscriber identity module may be performed. In various embodiments of the present disclosure, the communication module 470 may perform data communication (e.g., transmission and/or reception) via the second subscriber identity module based on at least one of the various parameters stored in the database.

In various embodiments of the present disclosure, the electronic device 401 may perform data communication (e.g., transmission and/or reception) via the second subscriber identity module based on a priority order parameter among the various parameters. Alternatively, the electronic device 401 may perform data communication (e.g., transmission and/or reception) based on a priority order determined for the various parameters.

In various embodiments of the present disclosure, if the tune-away operation is terminated (operation 770), the electronic device 401 may continue to communicate (e.g., transmit and/or receive) data using the first subscriber identity module (operation 780). In this case, the second subscriber identity module may enter an inactive state.

A communication method for an electronic device according to various embodiments of the present disclosure may include communicating with a first network using a first subscriber identity module, starting a tune-away operation for a second network, activating a second subscriber identity module if the tune-away operation is started, and communicating (e.g., transmitting and/or receiving) data using the second subscriber identity module.

In various embodiments of the present disclosure, the method may further include terminating the tune-away operation and inactivating the second subscriber identity module if the tune-away operation is terminated. Here, the communicating (e.g., transmitting and/or receiving) data using the second subscriber identity module may include checking a packet type of the data to be communicated (e.g., transmitted and/or received) and communicating (e.g., transmitting and/or receiving) the data according to a result of the checking. In this case, the method may include communicating (e.g., transmitting and/or receiving) the data using the second subscriber identity module if the packet type is a control message type or communicating (e.g., transmitting and/or receiving) the data using the first subscriber identity module after the tune-away operation is terminated if the packet type is not the control message type.

In various embodiments of the present disclosure, the communicating (e.g., transmitting and/or receiving) data using the second subscriber identity module may include checking a size of packets of the data to be communicated (e.g., transmitted and/or received) and communicating (e.g., transmitting and/or receiving) the data according to a result of the checking.

In various embodiments of the present disclosure, the communicating (e.g., transmitting and/or receiving) data using the second subscriber identity module may include communicating (e.g., transmitting and/or receiving) the data based on a database about a priority order of data communication (e.g., transmission and/or reception) stored in the electronic device.

Figure 8:
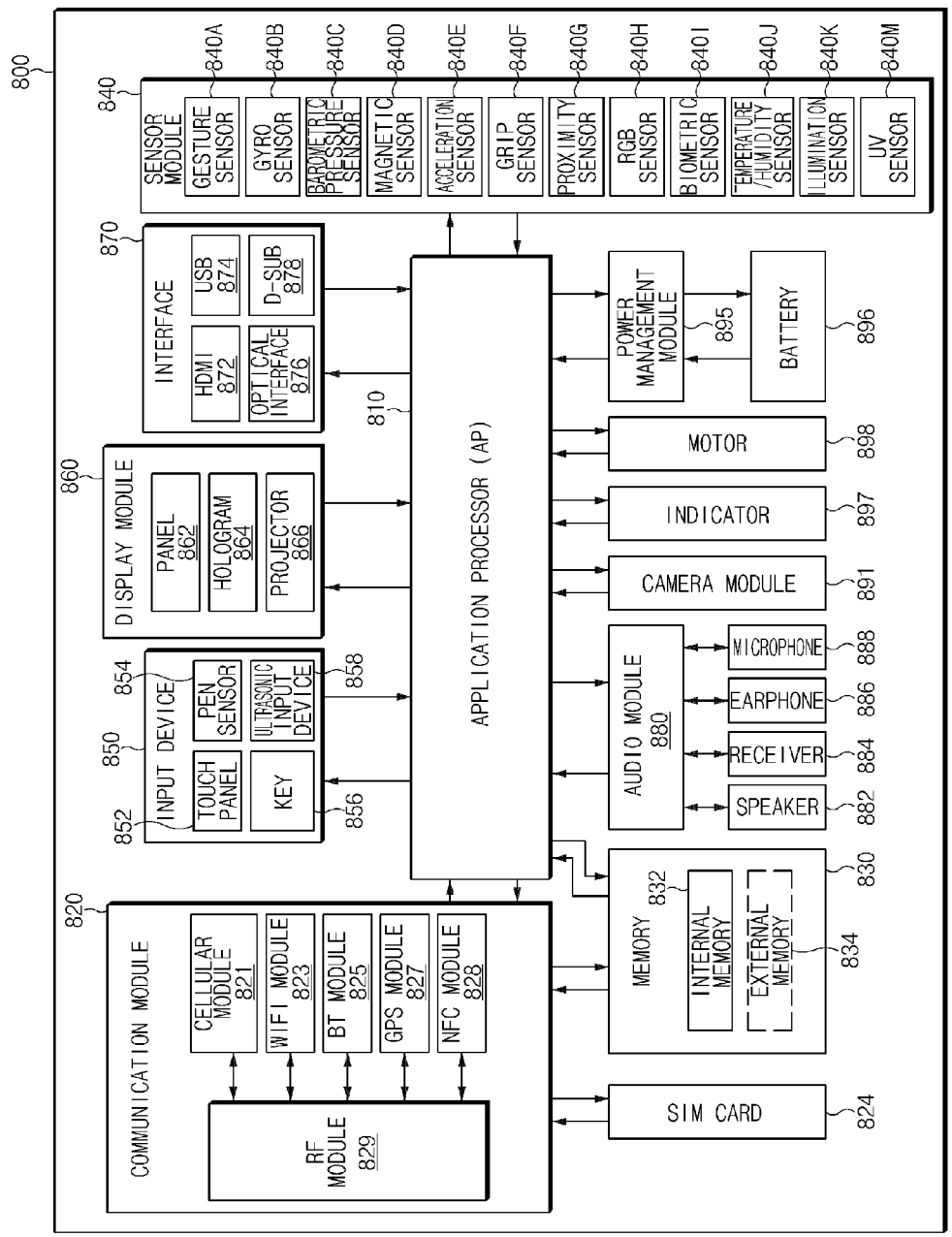
FIG. 8 is a block diagram illustrating an electronic device according to various embodiments of the present disclosure.

FIG. 8 is a block diagram illustrating an electronic device 801 according to various embodiments of the present disclosure.

Referring to FIG. 8, the electronic device 801 may include, for example, a part or the entirety of the electronic device 401 illustrated in FIG. 4. The electronic device 801 may include an application processor 810, a communication module 820, a subscriber identity module 824, a memory 830, a sensor module 840, an input device 850, a display 860, an interface 870, an audio module 880, a camera module 891, a power management module 895, a battery 896, an indicator 897, and a motor 898.

The application processor 810 may run an operating system or an application program so as to control a plurality of hardware or software elements connected to the application processor 810, and may perform various data processing and operations. The application processor 810 may be implemented with, for example, a system on chip (SoC). According to an embodiment of the present disclosure, the application processor 810 may further include a graphic processing unit (GPU) and/or an image signal processor. The application processor 810 may include at least a portion (e.g., a cellular module 821) of the elements illustrated in FIG. 8. The application processor 810 may load, on a volatile memory, an instruction or data received from at least one of other elements (e.g., a nonvolatile memory) to process the instruction or data, and may store various data in a nonvolatile memory.

The communication module 820 may have a configuration that is the same as or similar to that of the communication module 470 of FIG. 4. The communication module 820 may include, for example, a cellular module 821, a Wi-Fi module 823, a Bluetooth module 825, a GPS module 827, an NFC module 828, and an RF module 829.

The cellular module 821 may provide, for example, a voice call service, a video call service, a text message service, or an Internet service through a communication network. According to an embodiment of the present disclosure, the cellular module 821 may identify and authenticate the electronic device 801 in the communication network using the subscriber identity module 824 (e.g., a SIM card). According to an embodiment of the present disclosure, the cellular module 821 may perform at least a part of functions provided by the application processor 810. According to an embodiment of the present disclosure, the cellular module 821 may include a communication processor (CP).

Each of the Wi-Fi module 823, the Bluetooth module 825, the GPS module 827 and the NFC module 828 may include, for example, a processor for processing data communicated (e.g., transmitted and/or received) through the modules. According to some various embodiments of the present disclosure, at least a part (e.g., two or more) of the cellular module 821, the Wi-Fi module 823, the Bluetooth module 825, the GPS module 827, and the NFC module 828 may be included in a single integrated chip (IC) or IC package.

The RF module 829 may communicate (e.g., transmit and/or receive), for example, communication signals (e.g., RF signals). The RF module 829 may include, for example, a transceiver, a power amp module (PAM), a frequency filter, a low noise amplifier (LNA), an antenna, or the like. According to another embodiment of the present disclosure, at least one of the cellular module 821, the Wi-Fi module 823, the Bluetooth module 825, the GPS module 827, or the NFC module 828 may communicate (e.g., transmit and/or receive) RF signals through a separate RF module.

The subscriber identity module 824 may include, for example, a plurality of embedded SIMs and/or cards containing a subscriber identity module, and may include unique identification information (e.g., an integrated circuit card identifier (ICCID)) or subscriber information (e.g., international mobile subscriber identity (IMSI)).

The memory 830 (e.g., the memory 430) may include, for example, an internal memory 832 or an external memory 834. The internal memory 832 may include at least one of a volatile memory (e.g., a dynamic random-access-memory (DRAM), a static random-access-memory (SRAM), a synchronous dynamic random-access-memory (SDRAM), or the like), a nonvolatile memory (e.g., a one-time programmable read-only-memory (OTPROM), a programmable read-only-memory (PROM), an erasable and programmable read-only-memory (EPROM), an electrically erasable and programmable read-only-memory (EEPROM), a mask read-only-memory, a flash read-only-memory, a flash memory (e.g., a Not-AND (NAND) flash memory, a Not-OR (NOR) flash memory, or the like)), a hard drive, or a solid state drive (SSD).

The sensor module 840 may, for example, measure physical quantity or detect an operation state of the electronic device 801 so as to convert measured or detected information into an electrical signal. The sensor module 840 may include, for example, at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., a red/green/blue (RGB) sensor), a biometric sensor 840I, a temperature/humidity sensor 840J, an illumination sensor 840K, or an ultraviolet (UV) sensor 840M. The sensor module 840 may further include a control circuit for controlling at least one sensor included therein. In some various embodiments of the present disclosure, the electronic device 801 may further include a processor configured to control the sensor module 840 as a part of the application processor 810 or separately, so that the sensor module 840 is controlled while the application processor 810 is in a sleep state.

The input device 850 may include, for example, a touch panel 852, a (digital) pen sensor 854, a key 856, or an ultrasonic input device 858. The touch panel 852 may employ at least one of capacitive, resistive, infrared, and ultraviolet sensing methods. The touch panel 852 may further include a control circuit. The touch panel 852 may further include a tactile layer so as to provide tactile reaction to a user. The (digital) pen sensor 854 may include, for example, a sheet for recognition which is a part of a touch panel or is separate. The key 856 may include, for example, a physical button, an optical button, or a keypad. The ultrasonic input device 858 may sense ultrasonic waves generated by an input tool through a microphone (e.g., a microphone 888) so as to identify data corresponding to the ultrasonic waves sensed.

The display 860 (e.g., the display 460) may include a panel 862, a hologram device 864, or a projector 866. The panel 862 may have a configuration that is the same as or similar to that of the display 460 of FIG. 4. The panel 862 may be, for example, flexible, transparent, or wearable. The panel 862 and the touch panel 852 may be integrated into a single module. The hologram device 864 may display a stereoscopic image in a space using a light interference phenomenon. The projector 866 may project light onto a screen so as to display an image. The screen may be disposed in the inside or the outside of the electronic device 801. According to an embodiment of the present disclosure, the display 860 may further include a control circuit for controlling the panel 862, the hologram device 864, or the projector 866.

The interface 870 may include, for example, an HDMI 872, a USB 874, an optical interface 876, or a D-subminiature (D-sub) 878. The interface 870 may be included in the communication module 470 illustrated in FIG. 4. Additionally or alternatively, the interface 870 may include, for example, a mobile high-definition link (MHL) interface, an SD card/multi-media card (MMC) interface, or an infrared data association (IrDA) interface.

The audio module 880 may convert, for example, a sound into an electrical signal or vice versa. At least a portion of elements of the audio module 880 may be included in the input/output interface 450 illustrated in FIG. 4. The audio module 880 may process sound information input or output through a speaker 882, a receiver 884, an earphone 886, or the microphone 888.

The camera module 891 is, for example, a device for shooting a still image or a video. According to an embodiment of the present disclosure, the camera module 891 may include at least one image sensor (e.g., a front sensor or a rear sensor), a lens, an image signal processor (ISP), or a flash (e.g., an LED or a xenon lamp).

The power management module 895 may manage power of the electronic device 801. According to an embodiment of the present disclosure, the power management module 895 may include a power management integrated circuit (PMIC), a charger integrated circuit (IC), or a battery or fuel gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 896 and a voltage, current or temperature thereof while the battery is charged. The battery 896 may include, for example, a rechargeable battery and/or a solar battery.

The indicator 897 may display a specific state of the electronic device 801 or a part thereof (e.g., the application processor 810), such as a booting state, a message state, a charging state, or the like. The motor 898 may convert an electrical signal into a mechanical vibration, and may generate a vibration or haptic effect. Although not illustrated, a processing device (e.g., a GPU) for supporting a mobile TV may be included in the electronic device 801. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

Figure 9:
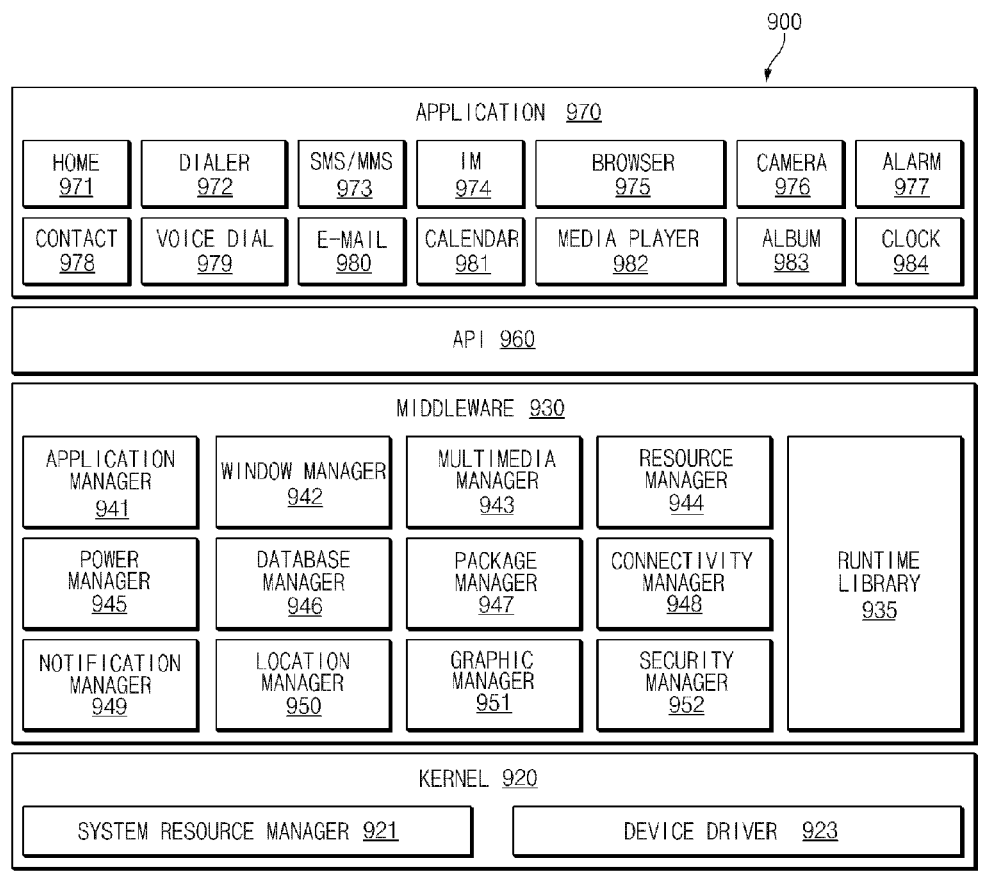
FIG. 9 is a block diagram illustrating a program module according to various embodiments of the present disclosure.

FIG. 9 is a block diagram of a program module 910 according to various embodiments of the present disclosure.

Referring to FIG. 9, according to an embodiment of the present disclosure, the program module 910 (e.g., the program 440) may include an operating system (OS) for controlling a resource related to an electronic device (e.g., the electronic device 401) and/or various applications (e.g., the application program 437) running on the OS. The operating system may be, for example, Android, iOS, Windows, Symbian, Tizen, Bada, or the like.

The program module 910 may include a kernel 920, a middleware 930, an API 960, and/or an application 970. At least a part of the program module 910 may be preloaded on an electronic device or may be downloaded from an external electronic device (e.g., the first external electronic device 402, the second external electronic device 404, or the server 406).

The kernel 920 (e.g., the kernel 431) may include, for example, a system resource manager 921 or a device driver 923. The system resource manager 921 may perform control, allocation, or retrieval of a system resource. According to an embodiment of the present disclosure, the system resource manager 921 may include a process management unit, a memory management unit, a file system management unit, or the like. The device driver 923 may include, for example, a display driver, a camera driver, a Bluetooth driver, a shared memory driver, a USB driver, a keypad driver, a Wi-Fi driver, an audio driver, or an inter-process communication (IPC) driver.

The middleware 930, for example, may provide a function that the applications 970 require in common, or may provide various functions to the applications 970 through the API 960 in order to allow the applications 970 to efficiently use limited system resources in the electronic device. According to an embodiment of the present disclosure, the middleware 930 (e.g., the middleware 433) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, or a security manager 952.

The runtime library 935 may include, for example, a library module that a complier uses to add a new function through a programming language while the application 970 is running. The runtime library 935 may perform a function for input/output management, memory management, or an arithmetic function.

The application manager 941 may mange, for example, a life cycle of at least one of the applications 970. The window manager 942 may manage a GUI resource used in a screen. The multimedia manager 943 may recognize a format required for playing various media files and may encode or decode a media file using a codec matched to the format. The resource manager 944 may manage a resource such as a source code, a memory, or a storage space of at least one of the applications 970.

The power manager 945, for example, may operate together with a basic input/output system (BIOS) to manage a battery or power and may provide power information required for operating the electronic device. The database manager 946 may generate, search, or modify a database to be used in at least one of the applications 970. The package manager 947 may manage installation or update of an application distributed in a package file format.

The connectivity manager 948 may manage wireless connection of Wi-Fi, Bluetooth, or the like. The notification manager 949 may display or notify an event such as message arrival, appointments, and proximity alerts in such a manner as not to disturb a user. The location manager 950 may manage location information of the electronic device. The graphic manager 951 may manage a graphic effect to be provided to a user or a user interface related thereto. The security manager 952 may provide various security functions required for system security or user authentication. According to an embodiment of the present disclosure, in the case where an electronic device (e.g., the electronic device 401) includes a phone function, the middleware 930 may further include a telephony manager for managing a voice or video call function of the electronic device.

The middleware 930 may include a middleware module for forming a combination of various functions of the above-mentioned elements. The middleware 930 may provide a module specialized for each type of an operating system to provide differentiated functions. Furthermore, the middleware 930 may delete a part of existing elements or may add new elements dynamically.

The API 960 (e.g., the API 435) which is, for example, a set of API programming functions may be provided in different configurations according to an operating system. For example, in the case of Android or iOS, one API set may be provided for each platform, and, in the case of Tizen, at least two API sets may be provided for each platform.

The application 970 (e.g., the application program 437), for example, may include at least one application for providing functions such as a home 971, a dialer 972, a Short Messaging Service (SMS)/Multi-Media Messaging Service (MMS) 973, an instant message (IM) 974, a browser 975, a camera 976, an alarm 977, a contact 978, a voice dial 979, an e-mail 980, a calendar 981, a media player 982, an album 983, a clock 984, health care (e.g., measure an exercise amount or blood sugar), or environmental information provision (e.g., provide air pressure, humidity, or temperature information).

According to an embodiment of the present disclosure, the application 970 may include an application (hereinafter referred to as an "information exchange application") for supporting information exchange between the electronic device (e.g., the electronic device 401) and an external electronic device (e.g., the first external electronic device 402 or the second external electronic device 404). The information exchange application may include, for example, a notification relay application for relaying specific information to the external electronic device or a device management application for managing the external electronic device.

For example, the notification relay application may have a function for relaying, to an external electronic device (e.g., the first external electronic device 402 or the second external electronic device 404), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device (or some elements) or the brightness (or resolution) adjustment of a display) of the external electronic device (e.g., the first external electronic device 402 or the second external electronic device 404) communicating with the electronic device, an application running in the external electronic device, or a service (e.g., a call service or a message service) provided from the external electronic device.

According to an embodiment of the present disclosure, the application 970 may include a specified application (e.g., a healthcare application of a mobile medical device) according to an attribute of an external electronic device (e.g., the first external electronic device 402 or the second external electronic device 404). According to an embodiment of the present disclosure, the application 970 may include an application received from an external electronic device (e.g., the server 406, the first external electronic device 402 or the second external electronic device 404). According to an embodiment of the present disclosure, the application 970 may include a preloaded application or a third-party application downloadable from a server. The names of the elements of the program module 910 illustrated may vary with the type of an operating system.

According to various embodiments of the present disclosure, at least a part of the program module 910 may be implemented with software, firmware, hardware, or a combination thereof. At least a part of the program module 910, for example, may be implemented (e.g., executed) by a processor (e.g., the application processor 810). At least a part of the program module 910 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the control module 420), the processor may perform functions corresponding to the instructions. The computer-readable storage medium may be, for example, the memory 430.

A computer-readable recording medium may include a hard disk, a floppy disk, a magnetic medium (e.g., a magnetic tape), an optical medium (e.g., CD-ROM, DVD), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

For example, a storage medium for storing computer-executable instructions according to various embodiments of the present disclosure may store instructions to be executed to instruct an electronic device to perform communicating with a first network using a first subscriber identity module, starting a tune-away operation for a second network, activating a second subscriber identity module if the tune-away operation is started, and communicating (transmitting and/or receiving) data using the second subscriber identity module. Furthermore, the storage medium may include instructions for performing the above-mentioned various methods.

The module or program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, even if user equipment performs a tune-away operation for receiving CS paging information while performing data communication via a first subscriber identity module, the user equipment may minimize a decrease of data throughput caused by the tune-away operation while maintaining communication (e.g., transmission and/or reception) of at least a part of data, by using a second subscriber identity module.

The above embodiments of the present disclosure are illustrative and not limitative. Various alternatives and equivalents are possible. Other additions, subtractions, or modifications are obvious in view of the present disclosure and are intended to fall within the scope of the appended claims.

What is claimed is:

1. An electronic device comprising:
   a first subscriber identity module (SIM) and a second SIM; and
   at least one processor configured to:
      communicate data via a packet switched (PS) network using the first SIM,
      change a network to which the first SIM is connected from the PS network to a circuit switched (CS) network,
      activate the second SIM and communicate, via the PS network, at least a part of the data using the second SIM while communicating, via the CS network, paging information using the first SIM, and
      inactivate the second SIM upon termination of the communicating the paging information.

2. The electronic device of claim 1, wherein the at least one processor is further configured to communicate the data based on a packet type of the data.

3. The electronic device of claim 1, wherein the at least one processor is further configured to communicate data of which the packet type is a control message type using the second SIM.

4. The electronic device of claim 1, wherein the at least one processor is further configured to communicate the data based on a size of packets of the data.

5. The electronic device of claim 1, further comprising a memory in which a database is stored,
   wherein the database stores at least one of a plurality of parameters comprising an application run by the electronic device, a process included in the application run by the electronic device, a task included in the process, types of packets associated with the task or the process, an average size of packets, and a priority order of communication by the second SIM, and
   wherein the at least one processor is further configured to communicate the data based at least on one of the parameters.

6. The electronic device of claim 5, wherein the at least one processor is further configured to communicate the data based on the priority order of communication among the plurality of parameters.

7. The electronic device of claim 1, wherein the at least one processor is further configured to inactivate the second SIM after communication of the data is completed, even if the communication of the paging information is terminated.

8. The electronic device of claim 1, wherein the at least one processor is further configured to communicate the data via the PS network using a frequency band different from that of the CS network.

9. The electronic device of claim 1, wherein each of the first SIM and the second SIM, which is contained in a universal integrated circuit card (UICC), is inserted into the electronic device, or is contained in an embedded UICC (eUICC) embedded in the electronic device.

10. A communication method of an electronic device, the method comprising:
communicating, via a packet switched (PS) network, data using a first subscriber identity module (SIM),
changing a network to which the first SIM is connected from the PS network to a circuit switched (CS) network,
activating the second SIM and communicating, via the PS network, at least a part of the data using a second SIM while communicating, via the CS network, paging information using the first SIM,
terminating the communication of the paging information, and
inactivating the second SIM when the communication of the paging information is terminated.

11. The method of claim 10, wherein communicating at least a part of the data using the second SIM comprises:
checking a packet type of the data to be communicated; and
communicating the data according to a result of the checking.

12. The method of claim 11, comprising:
communicating at least a part of the data using the second SIM when the packet type is a control message type, and communicating remaining data using the first SIM after the communication of the paging information is terminated when the packet type is not the control message type.

13. The method of claim 10, wherein communicating at least a part of the data using the second SIM comprises:
checking a size of packets of at least a part of the data to be communicated; and
communicating at least a part of the data according to a result of the checking.

14. The method of claim 10, wherein communicating at least a part of the data using the second SIM comprises communicating at least a part of the data based on a database associated with a prior order of data communication stored in the electronic device.

15. A non-transitory storage medium for storing computer-executable instructions to be executed to instruct an electronic device to perform:
communicating, via a packet switched (PS) network, data using a first subscriber identity module (SIM),
changing a network to which the first SIM is connected from the PS network to a circuit switched (CS) network,
activating the second SIM and communicating, via the PS network, at least a part of the data using a second SIM while communicating, via the CS network, paging information using the first SIM,
terminating the communication of the paging information, and
inactivating the second SIM when the communication of the paging information is terminated.

* * * * *